United States Patent [19]

Talapatra

[11] 4,066,344  
[45] Jan. 3, 1978

[54] LIGHT-WEIGHT ARCH TYPE STRUCTURES FOR LARGE REFLECTIVE MIRRORS

[76] Inventor: Dipak Chandra Talapatra, 6611 Elk Park Court, Alexandria, Va. 22310

[21] Appl. No.: 718,547

[22] Filed: Aug. 30, 1976

[51] Int. Cl.² .............................................. G02B 5/08
[52] U.S. Cl. ..................................................... 350/310
[58] Field of Search ............... 350/288, 293, 296, 310, 350/320

[56] References Cited

U.S. PATENT DOCUMENTS 3,514,275    5/1970    Bray .............................. 350/288 UX

FOREIGN PATENT DOCUMENTS 690,723    7/1964    Canada .................................. 350/296

OTHER PUBLICATIONS

Koppenhauer et al., Western Electric Technical Digest, No. 18, Apr. 1970, p. 25.

Primary Examiner—F. L. Evans

[57] ABSTRACT

Described are light-weight mirror substrates for large reflective telescopes. The substrates consist of arch type structures and are formed by removing materials in arch-like fashion from the conventional solid disc. The arch type structures are significantly superior to solid discs with respect to deflection and weight.

3 Claims, 5 Drawing Figures

LIGHT-WEIGHT ARCH TYPE STRUCTURES FOR LARGE REFLECTIVE MIRRORS

BACKGROUND OF THE INVENTION

A. Field of the Invention

The present invention relates to mirrors, and more particularly to substrates or underlying supporting structures for large reflective mirrros for astronomical telescopes.

B. Description of the Prior Art

An astronomical telescope mirror is basically a specular, reflective surface whose geometrical form is maintained by an underlying supporting structure or substrate. Traditionally, an astronomical mirror, large or small, is designed as a cylindrical disc having a diameter to thickness ratio of 8 to 1 (small aperture) or 6 to 1 (large aperture). The smaller ratio, recommended for large mirrors, reflects the importance of self-weight deflection, which is proportional to $(Radius)^4/(Thickness)^2$ for a mirror uniformly supported at its periphery. The long established use of the cylindrical disc as substrate for small aperture has led, by extension, to the use of such cylindrical solid substrates even for large aperture elements. For instance, the ground-based reflection telescope of Kitt Peak is 156 inches in diameter and 26 inches thick. This is characterized by a traditional aperture to thickness ratio of 6 to 1. A disc such as this has to be supported at many discrete points by carefully calculated and controlled forces, arranged to balance the gravitational forces which tend to deform the substrate as the mirror is maneuvered to occupy desired positions.

Thus, it is apparent that with ground based mirrors, as the size increases, the $(Radius)^4/(Thickness)^2$ relation for constant stiffness leads to excessive substrate weight with attendant problems of the support design. The Orbiting Astronomical Observatory (OAO) Program being carried out by NASA has aroused considerable interest in space telescopes. With space-borne telescopes, the reduction of substrate weight becomes even more important. Questions such as total mass to be accelerated in space and changes in the substrate shape as the telescope is taken from the one-g field to zero-g field have to be considered. One promising solution to the two major problems mentioned above is to design substrates having the highest possible stiffness-to-weight ratio.

The self-weight problem associated with large mirrors has long been recognized. The solid disc is not an optimum structure since material near the middle plane, when its axis coincides with the direction of gravity, is not fully stressed. Hence, it is attractive to develop, for both ground and space applications, structural forms in which such understressed material has been redistributed or removed to more effective locations.

Light-weight mirrors have been designed and constructed for satellite and ground applications by the adoption of ribbed and sandwiched structures. In designing mirror substrates, very few designers have made use of the obvious and logical account of certain fundamental theorems touching optimum structural design as enunciated in 1869 by James Clark Maxwell. Maxwell's theorem, shows that one class of optimum structure is that in which all the material employed is stressed, to an acceptable limit, in the same sense; either compression or tension. Membranes, arches and shells have this general characteristic. No examples of the use of arch-like mirror structures have been found in the literature, although suitable forms may be noted from architecture and civil engineering applications. Application of these forms to mirror structures has been getting some preliminary investigation and there has been some indication that these structures would be superior as mirror substrates.

Therefore, it is an objective of the present invention to provide arch type structures for large reflective mirror which have much smaller weight than conventional disc mirrors.

It is a further objective of the present invention to provide arch type structures for large reflective mirrors which are superior to disc mirrors with reference to stiffness.

It is yet another objective of the present invention to provide the above attributes in arch type structures for large reflective mirrors which are easier and more economical to fabricate.

Other objects and many of the attendant advantages of this invetion will be readily appreciated as they become better understood by reference to the following detailed description when considered in connection with the accompanying drawings.

SPECIFICATION AND DESCRIPTION OF THE INVENTION

Figure 1:
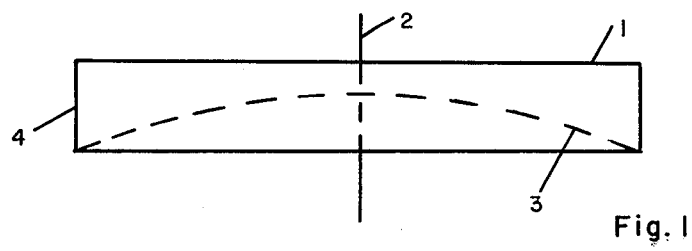
FIG. 1 is the end view of an arch type mirror structure where materials have been removed from the support face of a disc. This is referred to as Arch Model (1).
Figure 2:
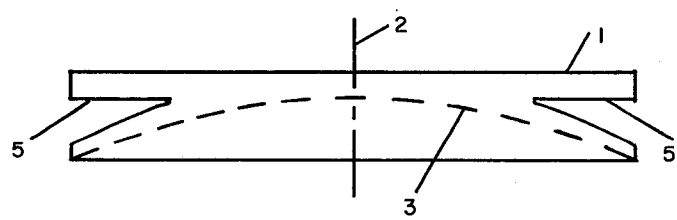
FIG. 2 is the end view of another arch type mirror structure where materials have been removed from the sides to form grooves. In addition, materials have been removed from the support face of the disc. This is referred to as Arch Model (2).
Figure 3:
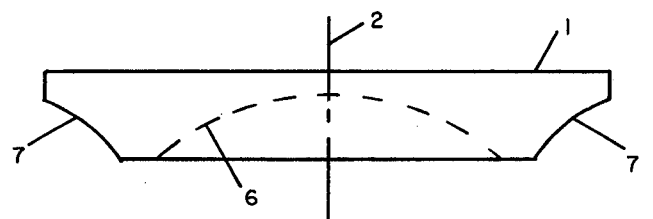
FIG. 3 is the end view of yet another arch type mirror structure where materials have been removed from the end in an arch-like fashion in addition to having removed materials from the support face of the disc. This is referred to as Arch Model (3).

As depicted in FIGS. 1, 2 and 3, the light-weight mirror structure is formed by removing materials from solid discs in arch-like fashion. These structures are solids of revolution where 2 represents the axis of rotation. The reflective surface 1 is fabricated on the top surfaces of these structures. In these structures, certain materials are removed from the solid disc so that the substrate proper remains but an arch transmits its body weight to the support points. FIG. 1 represents Arch Model (1) where materials are removed from the support face of the solid disc in an arch-like fashion as depicted by dotted line 3. The mirror structure thickness at the edge is indicated by 4. FIG. 2 represents Arch Model (2) where materials are removed from the support face of the solid disc by an arch 3. Here, materials are also removed by forming side grooves 5. FIG. 3 represents Arch Model (3) where materials are removed from the support face of the solid disc in an arch-like fashion as shown by dotted line 6. In addition, materials are removed from the sides in an arch-like fashion as shown by 7.

Figure 4:
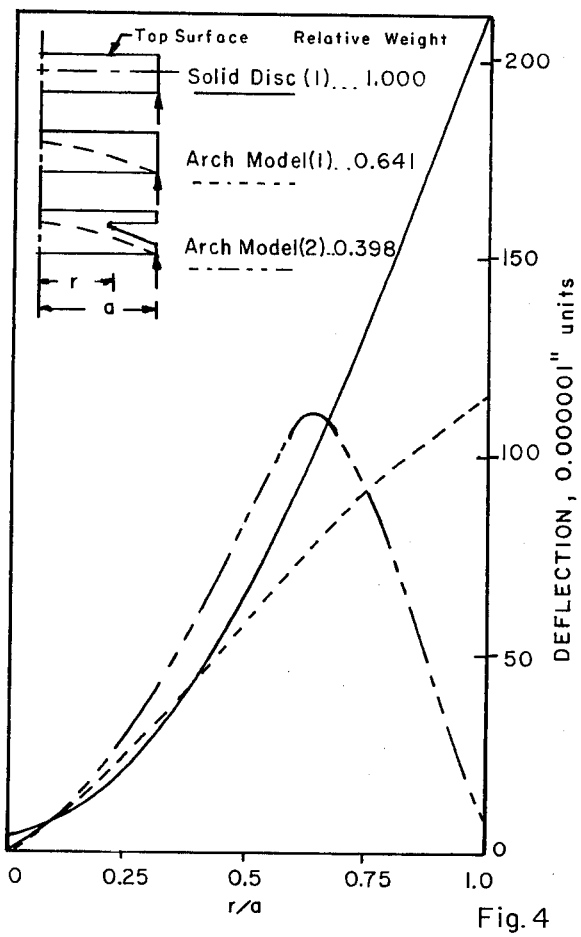
FIG. 4 is a comparison of the top surface deflections of solid disc with that of Arch Model (1) and (2), for ring support provided at the edge of the structure.
Figure 5:
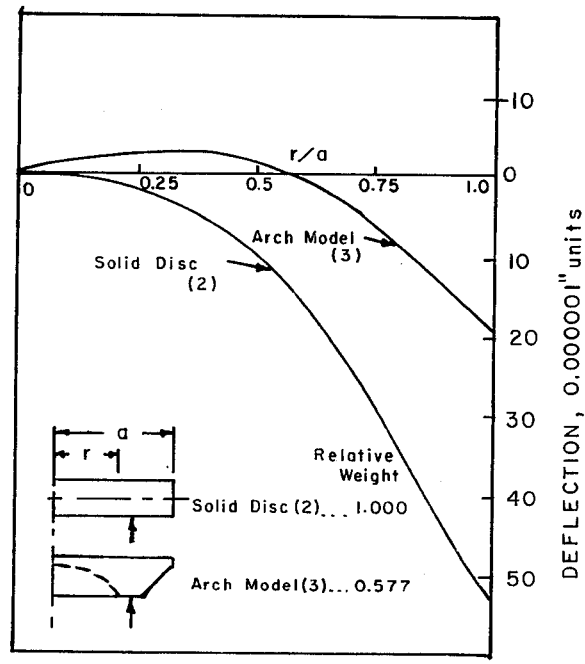
FIG. 5 is a comparison of the top surface deflections of solid disc with that of Arch Model (3), for ring support provided at 0.58 radius from the edge.

The superiority of the arch type structures over solid disc were established by conducting finite element structural analysis. The theoretical predictions were substantiated through experimental investigations with molded silicone rubber models. The theoretical self-weight top surface deflections of the various Arch Models are shown in FIGS. 4 and 5. For comparison, the deflections of the related solid discs are also included.

In designing a mirror structure, one is interested in achieving a low weight with high stiffness. Thus, in determining the merit of arched structures compared to solid discs, a parameter involving both weight and deflection is desired. For this purpose, a function called "figure of merit" has been defined as the ratio of the product of weight and deflection for the solid disc to that for the arched structure. A figure of merit value of 1 will indicate that the structure has some weight and deflection characteristics as of a solid disc. A value higher than 1 will indicate that the structure's weight and deflection characteristics are superior to those of a solid disc. Figure of merit values, based on the maximum deflection of the upper surface, for different arch models are shown below.

FIGURE OF MERIT VALUES $$\frac{\text{(Maximum Deflection} \times \text{weight) Solid Disc (2)}}{\text{(Maximum Deflection} \times \text{weight) Arch Model (3)}} = 4.87$$

$$\frac{\text{(Maximum Deflection} \times \text{weight) Solid Disc (1)}}{\text{(Maximum Deflection} \times \text{weight) Arch Model (2)}} = 4.68$$

$$\frac{\text{(Maximum Deflection} \times \text{weight) Solid Disc (1)}}{\text{(Maximum Deflection} \times \text{weight) Arch Model (1)}} = 2.84$$

A comparison of self-weight deflection patterns clearly establishes the great advantages of arching in designing light-weight mirror structures. For rign supports at the edge, the maximum lateral deflection for the solid disc is about two times higher than that of Arch Models (1) and (2). On the other hand, the weight of the solid disc is 35.9% and 60.2% higher than that of Arch Models (1) and (2), respectively. And the figure of merit values for Arch Models (1) and (2) are 2.84 and 4.68, respectively. For ring supports at 0.58 radius, the maximum deflection for the solid disc is about 2.8 times higher than that of Arch Model (3) whereas the weight of the solid disc is 42.3% higher than that of arch model (3), and the figure of merit value is 4.87.

The light-weight mirror structures provided here are much simpler in their geometric shapes in comparison to sandwich and ribbed type mirror structures. These simple geometric shapes can be easily fabricated by machining materials away from solid discs or can be directly molded to their basic shape and then machined to their final shape.

Having thus described the invention, what is claimed is:

1. A light-weight mirror structure consisting of a single solid cylindrical block having a reflecting face and a support face opposite the reflecting face, said support face being in the form of a structural arch with its apex coincident with the axis of rotation of the cylindrical block.

2. A light-weight mirror structure as claimed in claim 1, wherein there is a circumferential groove on the periphery of the cylindrical block between the reflective face and the support face.

3. A light-weight mirror structure as claimed in claim 1, wherein there is a circumferential arch at the periphery of the support face.

* * * * *